United States Patent [19]

Arima et al.

[11] Patent Number: 4,757,705
[45] Date of Patent: Jul. 19, 1988

[54] PLATE PROCESSING DEVICE HAVING GUIDE MEANS FOR A VERTICAL RAM

[75] Inventors: Yoshitaka Arima, Isehara; Hidekatsu Ikeda, Hatano; Toshiaki Kunihiro; Chuo Tobita, both of Isehara, all of Japan

[73] Assignee: Amada Company, Limited, Japan

[21] Appl. No.: 860,467

[22] Filed: May 7, 1986

[30] Foreign Application Priority Data

| May 8, 1985 | [JP] | Japan | 60-66838[U] |
| Jun. 3, 1985 | [JP] | Japan | 60-82468[U] |
| Jun. 3, 1985 | [JP] | Japan | 60-118892 |
| Jun. 3, 1985 | [JP] | Japan | 60-82469 |

[51] Int. Cl.⁴ .................................. B21J 13/04
[52] U.S. Cl. ........................ 72/456; 72/461; 72/389; 72/447; 100/214; 83/468
[58] Field of Search ............... 72/461, 389, 456, 457, 72/446, 447; 83/468, 640, 641, 395, 522; 100/214

[56] References Cited

U.S. PATENT DOCUMENTS

| 4,031,737 | 6/1977 | Cailloux | 72/456 |
| 4,331,020 | 5/1982 | Cros | 72/461 |
| 4,558,582 | 12/1985 | Meinig | 72/456 |

Primary Examiner—David Jones
Attorney, Agent, or Firm—Wigman & Cohen

[57] ABSTRACT

A plate processing device for use in a machine with a vertically acting ram; has a guide device mounted on the frame and a guide member which is pressed to a sliding surface of the ram. The guide member freely rotates around the centerline of the first vertical shaft and also freely rotates around the centerline of the second shaft perpendicular to the first shaft and parallel to the sliding surface and is constructed so that it follows the sliding surface of the ram. Also, a back gauge for the work is buffered against the shock of abutment with the workpiece and may be backed away from the workpiece. A pressing plate for the workpiece is supplied by a high pressure and a low pressure plunger, which are vertically actuated to provide a noiseless operation.

3 Claims, 7 Drawing Sheets

PLATE PROCESSING DEVICE HAVING GUIDE MEANS FOR A VERTICAL RAM

BACKGROUND OF THE INVENTION

1. Field of the Invention

The present invention relates to a device for processing a plate-shaped workpiece, and in particular to a plate processing device provided with a vertically acting ram, such as, for example, a shearing machine, press brake, or press machine.

2. Description of Prior Art

A ram with free vertical movement installed on a commonly known plate processing device such as a shearing machine or a press machine is usually guided in freely reciprocal movement by means of a ram guide mechanism mounted on a frame.

This ram guide mechanism generally operates through a gib between a guide member mounted vertically on a frame and the ram. Conventionally, therefore, in order to provide reliable surface contact for the gib and the guide member with the ram, high precision processing is necessary, and adjustment at the time the unit is assembled is very troublesome, causing problems in the assembly operation problem.

In addition, in the case where a conventional ram guide mechanism is adopted on a shearing machine, when adjusting the space between the upper and lower blades to conform to the plate thickness of a plate-shaped workpiece which is to be sheared, time is required to make the adjustment so that improvement of the operating efficiency is a problem.

Also, in a plate processing device such as a shearing machine or a press brake it is usual to provide a back gauge device in order to position the workpiece once the trailing edge is reached. When bending and shearing the workpiece, after the end is reached and the workpiece is positioned, this back gauge device is moved away from the workpiece a suitable distance. Accordingly, in a conventional back gauge device, when the end of the workpiece is reached there is no way to buffer the shock, and after the back gauge device is moved away from the work piece, it is not easy to quickly repeat the operation.

In addition, in a plate processing device such as a shearing machine, it is necessary to firmly secure the workpiece to the work table when the shearing process is being performed. Conventionally, a large volume of high pressure operating oil is supplied to the shearing means in the plate pressing device, rapidly activating the plate pressing device with a large force. Therefore, when the workpiece is secured by a pressure pad on the device, the pressure pad impacts the workpiece and a large impact noise is created, which is a problem.

SUMMARY OF THE INVENTION

A first object of the present invention is to provide, with due consideration to the drawbacks of such conventional devices, a plate processing device which is provided with a guide device which guides a ram in vertical operation and is easy to assemble and operate.

In order to accomplish this object in the present invention, a guide member is provided which is pressed against a sliding surface of a ram supported so that it may move freely in the vertical direction on a frame. This guide member is provided so that it freely rotates around the centerline of a first verical shaft, and also freely rotates around the centerline of a second shaft parallel to the previously mentioned sliding surface. The guide member is constructed so that it follows the sliding surface of the ram.

A second object of the present invention is to provide a plate processing device with which an extremely easy fine adjustment is obtained in the longitudinal direction of the ram.

In order to accomplish this object in the present invention, a sliding surface formed on the front side of a ram, which is supported so that it may move freely in the vertical direction on a frame, is energized by pressure toward the rear by a guide member positioned at the front of the ram. An upper guide roller which guides the upper vicinity of the back side of the above-mentioned ram is supported in a freely rotatable manner on a transverse side frame. A lower guide roller which guides the lower vicinity of the back side of the ram is supported in a freely rotatable manner on both side frames through the an eccentric shaft. A drive device is provided which controls the rotation of the eccentric shaft.

A third object of the present invention is to provide a plate processing device equipped with a back gauge device which buffers the shock when the trailing edge of the workpiece is reached and quickly returns to the base position after moving away from the workpiece.

In order to accomplish this object in the present invention, a freely-movable threaded rod, energized in the foward direction, is provided for moving a back gauge in the longitudinal direction. An operating device is provided to move the threaded rod.

A fourth object of the present invention is to provide a plate processing device in which the workpiece is noiselessly secured by pressure to the work table by means of a plate pressuring device.

In order to accomplish this object in the present invention, a hydraulic pressure producing device for supplying pressurized hydraulic fluid to a plate pressing device is provided on the plate processing device, along with a first plunger pump section for low pressure high output and a second plunger pump section for high pressure low output. The first plunger pump section is first activated so that the plate pressing device secures the workpiece with light pressure, and then the second plunger pump section is activated to firmly secure the workpiece with high pressure.

BRIEF DESCRIPTION OF THE DRAWINGS

These and other objects, features and advantages of the present invention will become more apparent from the following description of a preferred embodiment taken in conjunction with the accompanying drawings, in which.

DETAILED DESCRIPTION OF THE PREFERRED EMBODIMENTS

The present invention is not limited to a shearing machine but can be implemented in other plate processing devices such as a press break and the like. However, the following embodiments are explained for the case in which a shearing machine is implemented as the plate processing machine of the present invention.

Figure 1:
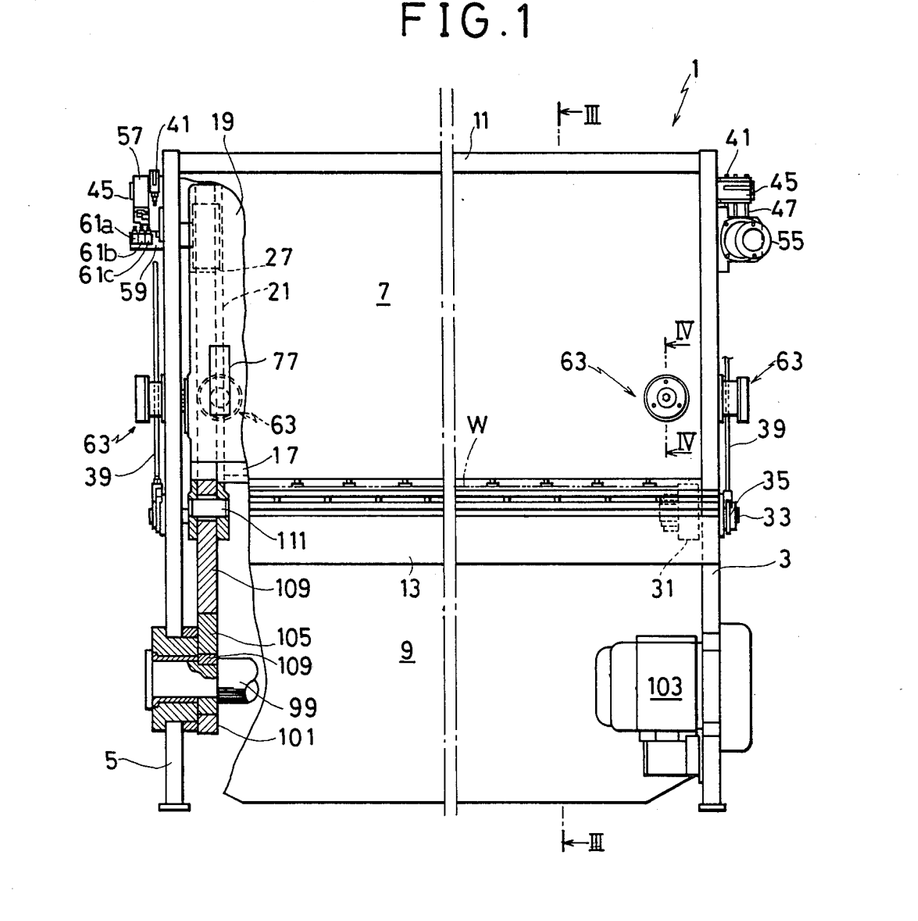
FIG. 1 is a front elevation, with one section cut away, of a shearing machine showing one embodiment of the plate processing device of the present invention.
Figure 2:
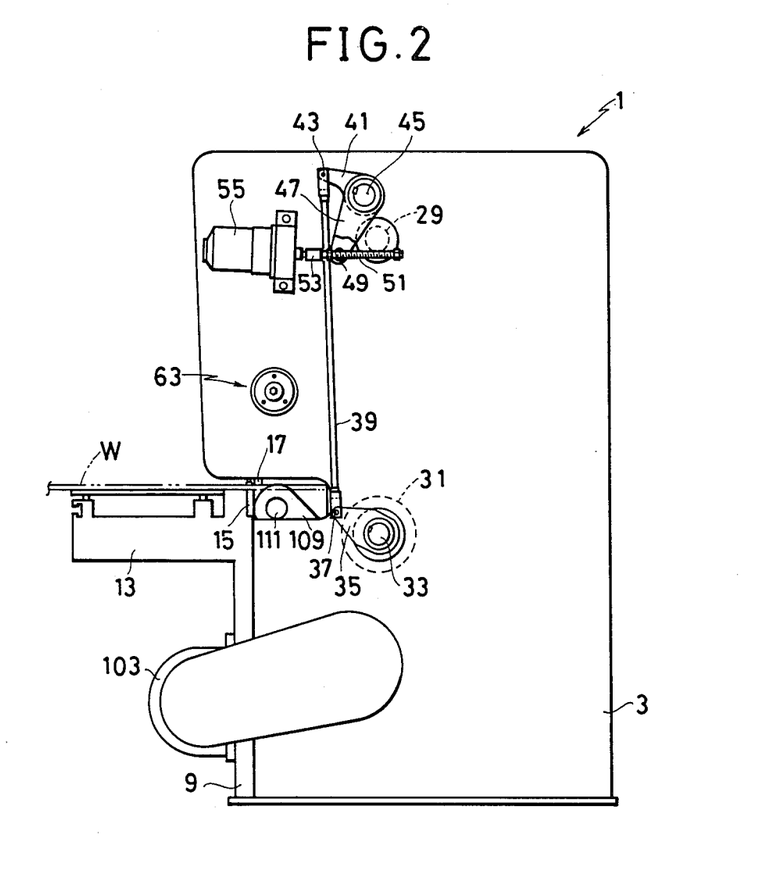
FIG. 2 is a right side elevation of the shearing machine of FIG. 1.
Figure 3:
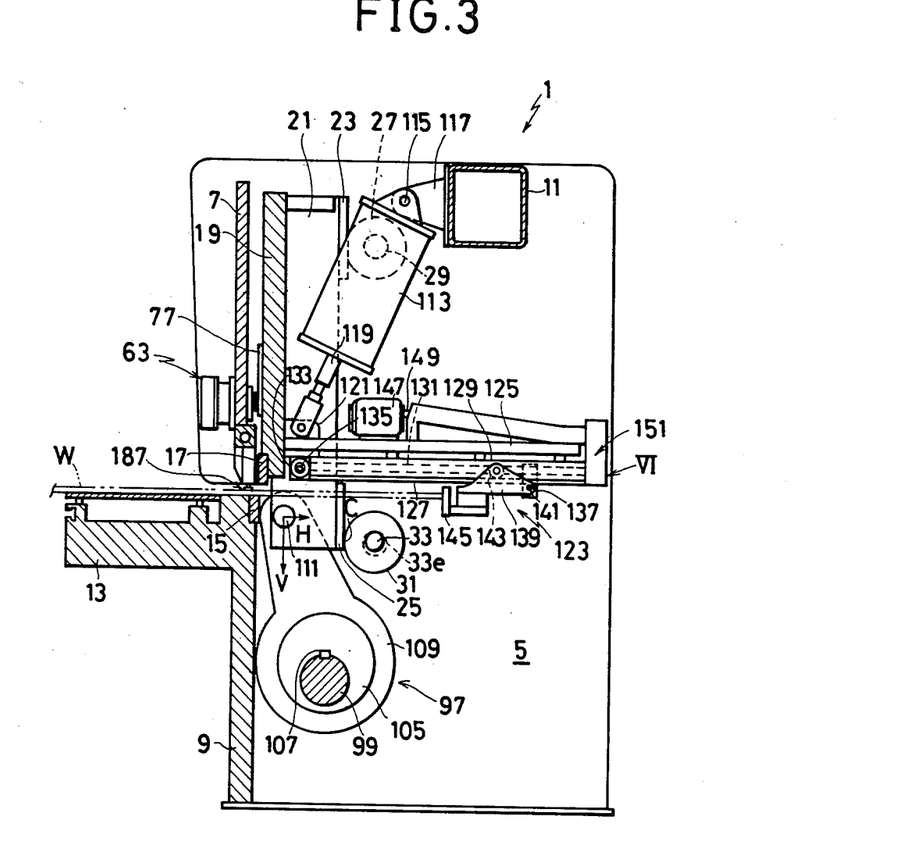
FIG. 3 is a sectional drawing viewed in the direction of the section III—III of FIG. 1.

Now referring to FIG. 1 to FIG. 3, a shearing machine 1 is provided with a plurality of side frames 3, 5 erected in parallel on its left and right sides. On the top of the front sides of the side frames 3, 5, an upper front plate 7 is provided integrally connected and secured to both left and right ends. In addition, both ends of a lower front plate 9 which is erected perpendicularly, are integrally connected and secured to the bottom of the front sides of the side frames 3, 5. Furthermore, the top section on the rear sides of the side frames 3, 5 are integrally connected through a beam member 11 extending in the transverse direction.

A work table 13 which supports a plate-shaped workpiece W is provided horizontally on the upper section of the lower front plate 9. A long lower blade 15 is detachably mounted in the transverse direction on the rear section of the work table 13. An upper blade 17 which works in cooperation with the lower blade 15 to shear the workpiece W is mounted at a suitable inclination on a ram 19 provided in a freely elevatable manner in the rear direction of the upper front plate 7.

In order to guide the ram 19 in the vertical direction and finely regulate its forward and backward motion, a plurality of long vertical rib members 21 are integrally mounted on the rear surface of both left and right side sections of the ram 19. A plurality of rear upper guide members 23 and a plurality of rear lower guide members 25 are mounted on the rear upper section and the rear lower section of the rib members 21. The left and right rear upper guide members 23 respectively contact a plurality of upper guide rollers 27, and each of the upper guide rollers 27 is supported so that it freely rotates on a supporting shaft 29 supported horizontally on the upper section of the left and right side frames 3, 5. The left and right rear lower guide members 25 respectively contact a plurality of lower guide rollers 31, and each of the lower guide rollers 31 is supported so that it can freely rotate on an eccentric section 33e provided on each of a plurality of eccentric shafts 33 which are supported so that they freely rotate on the lower section of the left and right side frames 3, 5.

Referring now to FIG. 2, in conjunction with FIG. 1, a base section of each arm member of a plurality of arm members 35 is mounted on each of the eccentric shafts 33, in order that the eccentric shafts 33 might rotate. On the tip of each arm member 35 the respective tips of a plurality of connecting rods 39 are connected in a pivotally supported manner through a pin 37. The opposite end of each of the connecting rods 39 is connected in a pivotally supported manner on a tip of one of a plurality of drive arms 41 through a pin 43. The bases of the drive arms 41 are integrally mounted on a single rotary shaft 45 which is supported to freely rotate in the vicinity of both ends of the upper section of the left and right side frames 3, 5. A swinging arm 47 is mounted on one end section of the rotary shaft 45. A threaded rod 51 extending in a direction transverse to a cylindrically-shaped pin nut member 49 is screwed onto the pin nut member 49 which is supported in a freely rotatable manner on the tip of the swinging arm 47. One end of the threaded rod 51 is connected to the output shaft of a drive device 55 through a universal joint 53. The drive device 55 can be a suitable control motor such as a servomotor, which can rotate both forward and in reverse, or a stepping motor, and is mounted on the side frame 3. A suitably shaped dog 57 is mounted on the other end of the rotary shaft 45. A plurality of detection devices 61a, 61b, and 61c supported on a bracket 59 mounted on the side frame 5 are provided in the position corresponding to the dog 57. The detection devices 61a, 61b, and 61c, which can be, for example, limit or proximity switches, detect the angle of rotation of the rotary shaft 45 in stages (for example, in eight stages) by simultaneous operation, individually or suitably combined, by means of the dog 57. As will be subsequently discussed, the detecion devices 61a, 61b, and 61c detect the spacing between the upper blade 17 and the lower blade 15.

As may be understood from the above explanation, by means of the above construction, when the threaded rod 51 is rotatably driven in a suitable direction by the drive device 55, the rotary shaft 45 is rotated in a suitable direction through the swinging arm 47. Accordingly, the transverse eccentric shaft 33 is rotated in a suitable direction through the drive arms 41, the connecting rod 39, and the arm member 35, so that the lower guide rollers 31, which are supported on the eccentric section 33e of the eccentric shaft 33, can be finely adjusted in the forward and back direction. Therefore, the lower section of the ram 19 can be finely adjusted in the longitudinal direction, and the spacing between the upper blade 17 and the lower blade 15 can be adjusted to conform to the plate thickness of the workpiece W. The detection devices 61a, 61b, and 61c detect the spacing between the upper blade 17 and the lower blade 15, being activated by the dog 57.

Specifically, by means of this construction, the spacing between the upper blade 17 and the lower blade 15 can easily be adjusted automatically in a plurality of steps, for example, small, medium, or large, related to the detection devices 61a, 61b, and 61c, by suitably controlling the drive device 55.

In order to ensure that there always is contact between the upper and lower guide rollers 27, 31 and the ram 19, a plurality of guide devices 63, which always energize the ram 19 by pressure in the rear direction, is provided in the vicinity of the left and right sides of the upper front plate 7. In addition, the guide devices 63 are provided on both the left and right side frames 3, 5 to guide the left and right sides of the ram 19.

Figure 4:
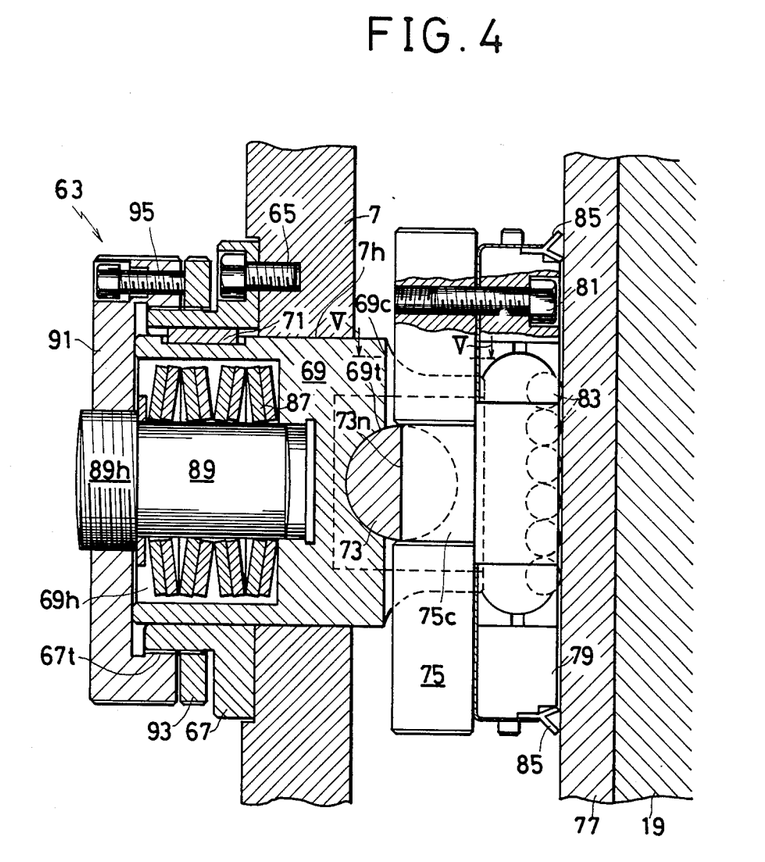
FIG. 4 is a sectional drawing viewed in the direction of the section IV—IV of FIG. 1.
Figure 5:
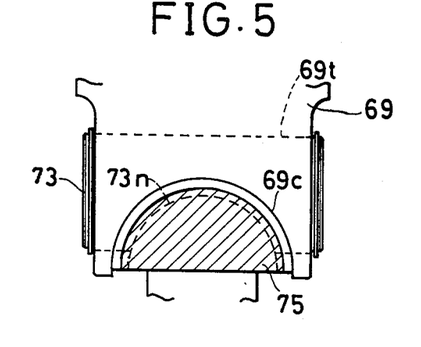
FIG. 5 is a sectional drawing viewed in the direction of the section V—V of FIG. 4.

Specifically, as shown in FIG. 4 and FIG. 5, a guide tube 67 is mounted on the upper front plate 7 by means of a plurality of bolts 65. A pressure activated member 69 which penetrates, in a freely sliding menner, a guide hole 7h formed in the upper front plate 7, is engagingly guided in a freely sliding manner in the guide tube 67. The pressure activated member 69, which is almost cylindrical, is always maintained in a uniform direction by means of a guide key 71 which intervenes between the pressure activated member 69 and the guide tube 67. The tip of the pressure activated member 69 points in the direction of the ram 19, and, on that tip, a vertical semicircular concave section 69c is formed which makes an opening in the side of the ram 19. A horizontal penetrating hole 69t which intersects the concave section 69c is also formed.

A horizontal rotating pin 73 fits into the penetrating hole 69t in the pressure activated member 69 in a freely rotating manner. This horizontally rotating pin 73 is formed with a semicircular cutout section 73n with a diameter slightly smaller than the concave section 69c in a position corresponding to the concave section 69c in the vertical direction, the cutout section 73n extending across the centerline of the horizontally rotating pin 73. A perpendicularly rotating pin 75 in the shape of a half cylindrical column extended in the vertical direction and positioned within the concave section 69c of the pressure activated member 69 is supported in a freely rotatable manner on the semicircular cutout section 73n of the horizontally rotating pin 73. The diameter of the perpendicularly rotating pin 75 is made larger than the diameter of the cutout section 73n of the horizontally rotating pin 73, and smaller than the diameter of the concave section 69c of the pressure activated member 69. On the center section of the longitudinal direction of the perpendicularly rotating pin 75, a small diameter constricted section 75c, which mates with the cutout section 73n in the horizontally rotation pin 73, is formed in the shape of a groove. A guide member 79, which slides against a sliding surface member 77 mounted on the ram 19, is mounted by a plurality of bolts 81 on the surface where the perpendicularly rotating pin 75 opposes the ram 19. The guide member 79 is provided with a plurality of freely rotating rollers 83, and, in addition, a plurality of wipers 85 are provided on its top and bottom ends.

As a result of this construction, the horizontally rotating pin 73 suitably rotates around its horizontal axis, and the perpendicularly rotating pin 75 suitably rotates around its perpendicular axis, so that the guide member 79 is guided along the sliding surface of the sliding surface member 77 of the ram 19. Specifically, the surface contact between the sliding surface member 77 and the guide member 79 is reliably carried out, and good guide operation is obtained.

A spring 87, which may be an initially coned disc spring, is provided on the pressure activated member 69 to pressure energize the sliding surface member of the ram 19. Specifically, a comparatively large hole 69h is formed in the base side of the pressure activated member 69. The spring 87, which is supported on a holder pin 89, is accommodated internally in the hole 69h. A head section 89h of the holder pin 89 is mounted in a freely adjustable manner by being screwed onto a cap screw 91. The cap screw 91 is mounted in a freely adjustable manner by being screwed onto a threaded section 67t which is formed on the exterior peripheral surface of the guide tube 67. The cap screw 91 is connected through a suitable number of bolts 95 to a ring nut member 93 which is screwed onto the threaded section 67t.

Accordingly, the guide member 79 is always energized by pressure against the sliding surface member 77 of the ram 19 by the action of the spring 87. Further, the configuration of the guide device 63 which is mounted on the left and right side frames 3, 5 which penetrate both the left and right side surfaces of the ram 19, is the same as the configuration of the previously described guide device so that a redundant explanation is not repeated here.

The guide member 63 with the abovementioned configuration can be adopted in place of the guide rollers 27, 31. In addition, the guide member 79 on the guide device 63 can be modified to the same structure as the guide members 23, 25. This modified guide device, opposing the vertical guide rollers 27, 29, can be mounted on the rear section of the ram 19.

Again referring to FIG. 1 to FIG. 3, an elevation device 97 is provided at the lower position of the ram 19 to elevate the ram 19. The elevating device 97 in this embodiment of the present invention is formed from an eccentric shaft. Specifically, a drive shaft 99 is positioned at the lower position of the ram 19 with a little offset to the rear of the position directly under the ram 19. Both ends of the drive shaft 99 are supported in a freely rotatable manner by a plurality of bearings 101 mounted on the side frames 3, 5, and the drive shaft 99 is suitably connected to a drive motor 103 mounted on the side frame 3.

Near both ends of the drive shaft 99, each of eccentric plates 105 is integrally secured by means of a key 107. The base of a connecting rod 109 engages each eccentric plate 105. The end of each connecting rod 109 is pivotally connected to the bottom section of the rib member 21 through a connecting pin 111. The connecting pin 111 is always positioned above a point C where the lower guide roller 31 and the lower rear guide member 25 make contact.

In addition, a balance spring or balance cylinder 113 is provided on the rear section of the ram 19 to smoothly elevate the ram 19. Specifically, the balance cylinder 113 is for weight and balance of the ram 19 and is installed slanting upwardly toward the rear. Its base is supported through a pin 115 on a bracket 117 secured to the beam member 11. The tip of a piston rod 119 provided in a freely reciprocating manner on the balance cylinder 113 is connected to a bracket 121 mounted on the rear section of the beam 19.

By means of the above construction, when the drive shaft 99 rotates because of the action of the drive motor 103, the ram 19 is elevated by the eccentric plate 105 and the connecting rod 109. The workpiece W is then sheared by the action of the upper blade 17 and the lower blade 15. At this time, when the ram 19 descends, a horizontal component H in the rear direction and a perpendicular component V acts on the connecting pin 111. By the action of the horizontal component H, the ram 19 has a tendency line 35, delete "with, as centeres," and insert to move in the direction shown with, as centers, the point of contact of the upper guide roller 27 and the rear upper guide member 23, and the point of contact C of the lower guide roller 31 and the rear lower guide member 25. However, because the connecting pin 111 is always positioned above the point of contact C, the ram 19 is not separated from the upper guide roller 27 and the lower guide roller 31.

Now referring to FIG. 3, a back gauge device 123 is mounted on the rear section of the ram 19 to set the shearing dimensions of the workpiece W when the workpiece W is sheared by the upper blade 17 and the lower blade 15. More specifically, a plurality of support bases 125, extending in the rear direction, is mounted near the left and right sides of the rear surface of the ram 19. A plurality of channel members 129, provided with a guide rail on both sides of the lower edge, is mounted horizontally on the lower section of each of the support bases 125. In the inner section of each channel member 129, a lead screw 131 is supported in a freely removably manner. Each lead screw 131 is rotated synchronously by a connecting shaft 135 provided in the transverse direction for connecting a plurality of gear boxes 133, which are provided on the base side of each channel member 129, with a bevel gear and the like inside each gear box 133.

The front end of each of the lead screws 131, for which a detailed drawing is omitted, is connected to the bevel gear in the gear box 133 through a spline, and as will be explained later, each lead screw 131 is provided so that it can move in the longitudinal direction. A nut member 137 is screwed perpendicularly on each lead screw 131, and on each nut member 137 a back gauge carriage 139 is connected through a pin 141. The lower blade 15 and both end sections of a back gauge 145 extended horizontally in the transverse direction are connected to each back gauge carriage 139. Accordingly, because each lead screw 131 is rotating synchronously in the same direction, the back gauge 145 moves suitably in the longitudinal direction, and the shearing dimensions of the workpiece W can be set.

In order to rotate the lead screws 131, a suitable control motor 147, which may be, for example, a servomotor or a stepping motor, is mounted on a single suitable support base 125. An output shaft 149 of this control motor 147 is suitably connected to the lead screws 131. Specifically, as is shown more clearly in FIG. 6, a gear box 151 is mounted on the rear end section of the channel members 129. A shaft 155 of a drive gear 153, supported in a freely rotatable manner on the gear box 151, is connected to the output shaft 149 of the control motor 147 through a universal joint 157.

Figure 6:
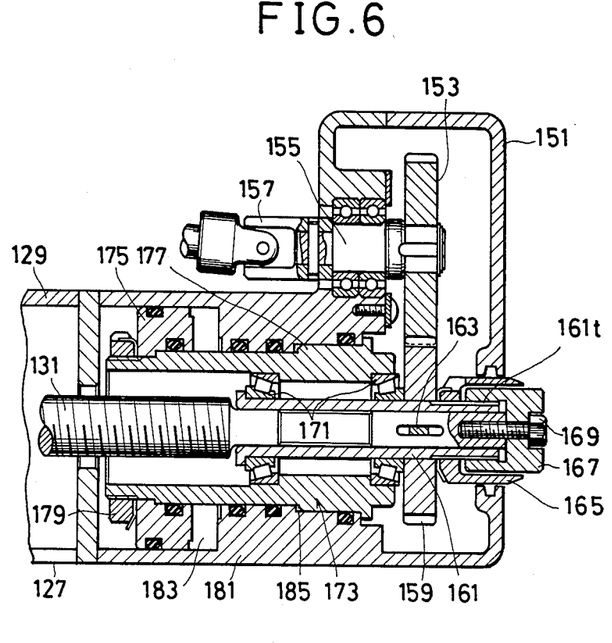
FIG. 6 is an expanded secional drawing of the section VI in FIG. 3.

A driven gear 159 which engages the drive gear 153 is integrally mounted on a hollow shaft 161. The rear end section of the lead screw 131, which is slidingly inserted in the hollow shaft 161, and the hollow shaft 161 itself are connected through a key 163 so that they rotate integrally. Accordingly, the lead screw 131 can be rotated by the control motor 147.

A threaded section 161t is formed on the rear end section of the hollow shaft 161. A graduated member 165, providing suitable scale graduations, is secured by being screwed onto this threaded section 161t, and a cap nut member 167 is screwed on in a freely adjustable manner. The cap nut 167 and the rear end section of the lead screw 131 are connected through a connecting bolt 169. Accordingly, the lead screw 131 can be slightly adjusted in the longitudinal direction relative to the hollow shaft 161 by tightening the connecting bolt 169 to adjust the screwed position of the cap nut member 167 relative to the hollow shaft 161.

The hollow shaft 161 is supported in a freely rotatable manner inside a hollow piston rod 173 through a plurality of bearings 171. A first piston 175 and a second piston 177 are integrally mounted on the outer peripheral surface of the piston rod 173 separated by a suitable difference. The first piston 175 is installed on the piston rod 173 through a nut 179. The first piston 175 is inserted in a freely sliding manner into an air pressure chamber 183 which is formed in a cylinder 181 mounted on the rear end section of the channel member 129. When compressed air is fed into the air pressure chamber 183 the piston rod 173 is pushed to the left, and the lead screw 131 to the front, in FIG. 6. The second piston 177 is integrally formed with the piston rod 173, and is inserted ih a freely sliding manner into a hydraulic chamber 185 formed in the cylinder 181. When hydraulic fluid is fed into the hydraulic chamber 185, the piston rod 173 resists the pressure in the air pressure chamber 183 and moves to the right, while the lead screw moves to the rear, in FIG. 6. Further, the stroke of the piston rod 173 is in the range in which the drive gear 153 and the driven gear 159 remain engaged. In addition, the support structure on the other end section of the lead screw 131 has no gear for power transmission, but aside from that it is of the same configuration as previously described, so the details will not be explained here again.

By means of the above construcion, when compressed air is supplied to the air pressure chamber 183 of the cylinder 181, the lead screw 131 is energized and pushed in the forward direction. It neutralizes the shock to the back gauge 145 when the trailing edge of the workpiece W is reached. In addition, when hydraulic fluid such as pressurized oil is fed into the hydraulic chamber 185 of the cylinder 181, the lead screw 131 is moved in the rear direcion, and the back gauge 145 is separated from the trailing edge of the workpiece. Accordingly, when the shearing action occurs, the back gauge 145 is quickly backed off, and after shearing, the reactivation of the return to the base position is accurately and quickly carried out.

As previously explained, when the workpiece is sheared by means of the upper blade 17 and the lower blade 15, a plate pressurizing device 187, for securing the workpiece W on the work table 13 by pressure, is provided on the lower section of the upper front plate 7. The plate pressurizing device 187 is provided with a pressure pad for securing the workpiece W by pressure, and, as shown in detail in FIG. 7, in the same way as for a usual plate pressuring device, a piston 187P is provided, constructed in a single-acting cylinder format and equipped with a return spring 189. The plate pressurizing device 187 is of the usual construction so the details will not be explained here. However, the plate pressurizing device 187 is constructed so that its action is related to the cylinder 181 for moving the lead screw 131 in the axial direction.

Figure 7:
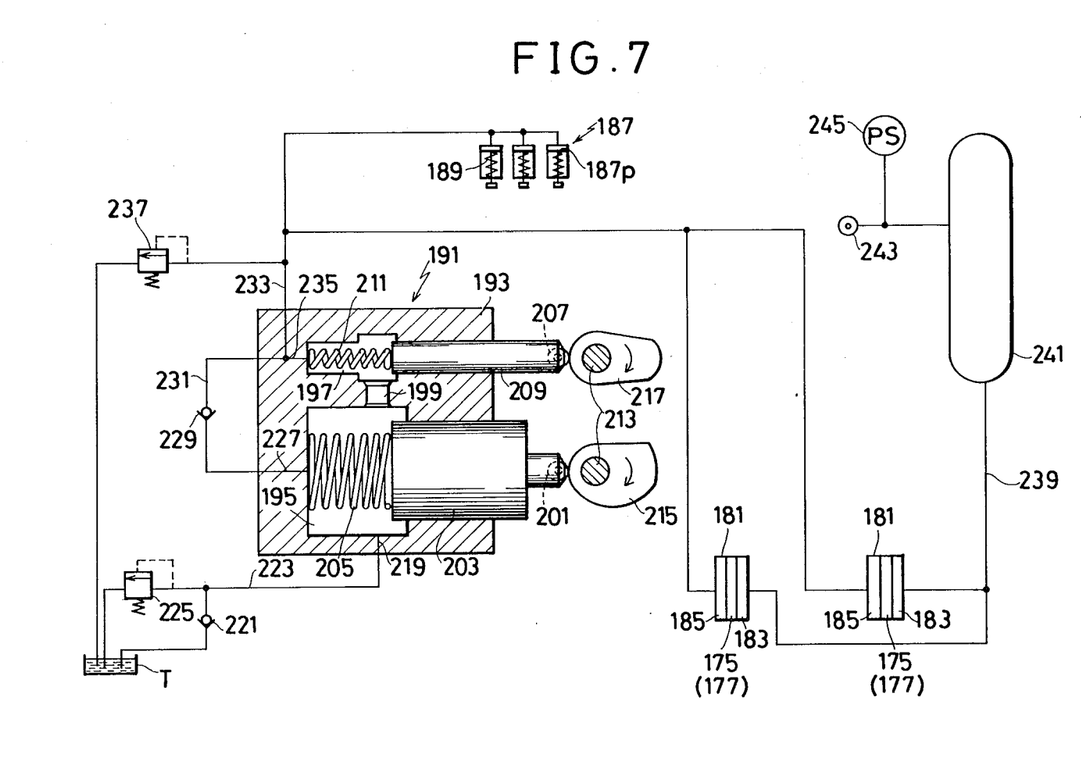
FIG. 7 is a circuit drawing giving a general view of a hydraulic pressure generating device which supplies hydraulic fluid to a plate pressurizing device. This drawing also shows the connections between the hydraulic pressure generating device and the plate pressuring device.

Specifically, as is clearly shown in FIG. 7, the plate pressurizing device 187 and the hydraulic chamber 185 of the cylinder 181 are connected to a common hydraulic pressure generating device 191. The hydraulic pressure generating device 191 comprises one type of plunger pump. A cylinder block 193 in the hydraulic pressure generating device 191 has a large diameter, low presure, large capacity chamber 195, and a small diameter, high pressure, low capacity chamber 197. The chambers 195 and 197 communicate through a communication orifice 199. A large diameter plunger 203, provided with a cam follower 201 on its outer edge, penetrates the low pressure high capacity chamber 195 in a freely sliding manner. The plunger 203 is always energized in the direcion by which it protrudes to the outer direction by means of a spring 205 which may be a coil spring housed in the low pressure high capacity chamber 195. In addition, a small diameter plunger 209, which has a cam follower 207 on its outer edge, penetrates the high pressure, low capacity chamber 197 in a freely sliding manner. The plunger 209 is always energized in the direction by which it protrudes to the outer direction by means of a spring 211 in the high pressure, low capacity chamber 197.

The cam followers 201, 207 provided on the large diameter plunger 203 and the small diameter plunger 209, respectively make contact with a first cam 215 and a second cam 217 which are installed on a plurality of cam shafts 213. A detailed drawing has been omitted. However the cam shaft 213 are suitably connected to the drive shaft 99 and rotate synchronously with the drive shaft 99 on the elevating device 97, to activate the elevation of the ram 19. The first cam 215, rapidly activates the large diameter plunger 203 through the rotation of the drive shaft, at the same time as the ram 19 first begins its descent from the upper dead point. Before the shearing of the workpiece W is started as a result of the descent of the ram 19, a high volume of hydraulic fluid is expelled from the low pressure large capacity chamber 195. In addition, the second cam 217 causes the small diameter plunger 209 to penetrate the high pressure low capacity chamber 197, and is activated to cause the generation of high pressure hydraulic liquid immediately before the shearing of the workpiece W begins.

A suction port 219 on the low pressure, high capacity chamber 195 is connected to an oil tank T through an suction line 223 containing a check valve 221. In this suction line 223 a safety relief valve 225 is branchingly connected. A discharge port 227 in the low pressure, high capacity chamber 195 is connected to the main fluid line 233 through a connecting line 231 in which is installed a check valve 229. In addition, a discharge port 235 on the high pressure low capacity chamber 197 is directly connected to a main hydraulic line 233.

The main hydraulic line 233 is connected to the plate pressurizing device 187, and is also connected to the hydraulic chamber 185 of the cylinder 181. The relief valve 237 is branchingly connected to the main hydraulic line 233. As is more clearly shown in FIG. 7, the air pressure chamber 183 of the cylinder 181 is connected to an air chamber 241 through a compressed air line 239. The air chamber 241 is suitably connected to a compressed air source 243, and a pressure switch 245 for detection pressure is connected to the air chamber 241.

By means of the above construction, when the drive shaft 99 for elevating the ram 19 is rotated, thus rotating the cam shafts 213, this causes the first and second cams 215, 217 to be rotated. By the rotation of the first and second cams 215, 217, first the large diameter plunger 203 is quickly activated and low pressure operating fluid is supplied to the plate pressurizing device 187 and the hydraulic chamber 185 of the cylinder 181. By supplying the operating fluid to the plate pressurizing device 187, the piston 187P for securing the workpiece W on the work table 13 is activated and the workpiece W is lightly secured by pressure to the work table 13. At this time, the pressure pad on the plate pressurizing device 187 lightly contacts the workpiece W, so that there is no loud sound of contact and the workpiece W is secured by pressure in a comparatively quiet manner. On the other hand, in the cylinder 181, operating fluid at low pressure is also supplied to the hydraulic chamber 185, and the air pressure in the air pressure chamber 183 causes the piston 175 (177) to be held immobile.

When the cam shaft 213 rotates further, the small diameter cylinder 209 is inserted into the high pressure, low capacity chamber 197, utilizing the pressure of the second cam 217. High pressure operating fluid is supplied to the main fluid line 233, and the plate pressurizing device 187 holds the workpiece W strongly on the work table 13. After that, the pressure in the main fluid line 233 is further elevated when the plunger 209 is pressurized by means of the second cam 217. When the pressure in the main fluid line 233 is elevated in this manner, the pressure equilibrium between the hydraulic chamber 185 in the cylinder 181 and the air pressure chamber 183 is destroyed and the piston 175 (177), as already explained, acts through the lead screw 131 to push back the back gauge 145.

Therefore, through this circuit configuration, after the workpiece W has been secured by pressure to the work table 13 by the plate pressurizing device 187, the back gauge 145 is moved back. The workpiece W is then sheared by the upper blade 17 and the lower blade 15.

Figure 8:
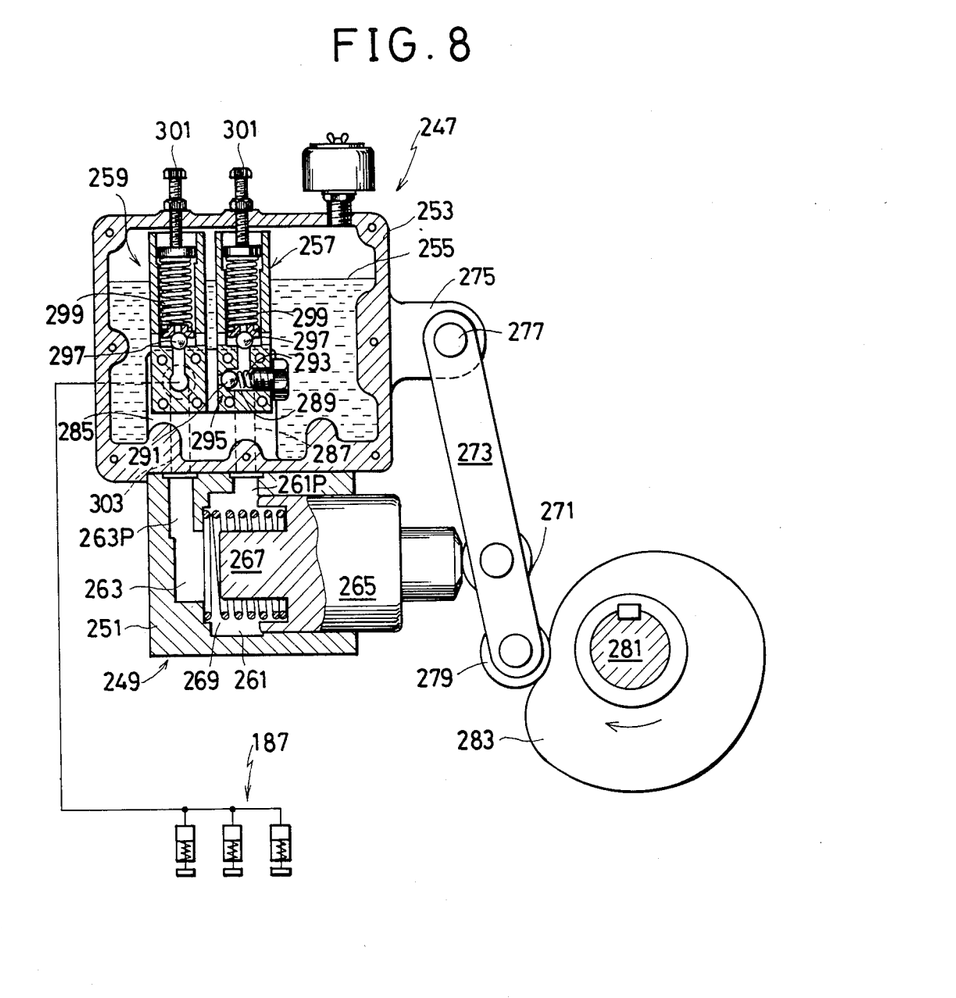
FIG. 8 is an sectional explanatory drawing of a second embodiment of the hydraulic pressure generating device.

FIG. 8 shows a second embodiment of a pressure generating device. A pressure generating device 247 comprises a cylinder block 251 of a plunger pump 249 and a casing 253 of an oil tank which are integrally secured by bolts or the like. An adequate amount of an oil 255 is filled into the casing 253, into which a low pressure relief valve 257 and a high pressure relief valve 259 are built.

Specifically, a large diameter, low capacity chamber 261 provided with an outlet port 261P is formed in the cylinder block 251 in the plunger pump 249. A small diameter, high pressure low capacity chamber 263, provided with a discharge port 263P is formed coaxially with the bottom section of the low pressure, high capacity chamber 261. A large diameter plunger 265 penetrates in a freely sliding manner into the low pressure, high capacity chamber 261. A small diameter plunger 267 is formed so that it engages in a freely separable manner the high pressure low capacity chamber 263 on the inner end of the plunger 265. A return spring 269 is fitted between the large diameter plunger 265 and the bottom section of the low pressure, high capacity chamber 261. The plunger 265 is always energized toward the outside.

In order to activate the plunger 265, a swinging lever 273 is provided on which is installed a roller 271 joined to the outer end of the plunger 265. Specifically, the base section of swinging lever 273 is pivotally supported through a pivot 277 on a bracket 275 provided on the casing 253. The roller 271 is installed near the tip of the swinging lever 273. A cam follower 279 is mounted in a freely rotating manner on the tip of the swinging lever 273. The cam follower 279 contacts, in a freely rotatable manner, the periphery of a suitably-formed cam 283 integrally mounted on a cam shaft 281.

By means of the above construction, the plunger 265 is caused to slide by the suitable rotation of the cam shaft 281. While the plunger 265 is opposed by the resistance of the return spring 269, a suitable volume of the operating fluid is discharged from the low pressure high capacity chamber 261. Then, the small diameter plunger 26 is caused to penetrate into the high pressure, low capacity chamber 263, and high pressure operating fluid is discharged from the high pressure, low capacity chamber 263.

The low pressure relief valve 257 and the high pressure relief valve 259 are mounted, through a plurality of bolts, on a support block 285 formed in the casing 253. A connecting chamber 289 is formed in the low pressure relief valve 257 and is connected to the outlet port 261P of the low pressure, high capacity chamber 261 through a communication orifice 287 which is formed in the support block 285. In the connecting chamber 289, a check valve 295 is provided which comprises a ball 291, which only allows suction of the oil 255 from inside the casing 253, and a spring 293. Further, in the relief valve 257, a ball 297 and a spring 299 are provided to allow the operating fluid to escape when the pressure in the connecting chamber 289 goes above a prescribed pressure. The energization of the spring 299 is freely adjustable by means of an adjusting bolt 301 which is screwed into the casing 253. Further, the relief valve 257 is constructed in the same manner as a normal relief valve so a more detailed explanation is omitted.

The high pressure relief valve 259 is connected to the discharge port 263P of the high pressure, low capacity chamber 263 through a communication orifice 303, and is also connected to the plate pressurizing device 187. In addition, the structure of the high pressure relief valve 259 is the same as that of the low pressure relief valve 257, with the exception of the check valve 295, so that the structural members which perform the same functions bear the same identifying numbers. A more detailed explanation is therefore omitted.

In the pressure generating device with the structure described above, the plunger pump 249 and the oil tank casing 253 are integrally constructed, and the relief valves 257, 259 are built into the casing 253, so that the overall construction has been made compact. This structure can be handled as a single unit, and both assembly and handling are easy. In addition, the large diameter plunger 265 and the small diameter plunger 267 in the plunger pump 249 are integrally formed so that both the manufacture and assembly are simple.

As can be understood from the explanation fo the above embodiment, by means of the present invention, the guide member of the guide device follows the sliding surface of the freely elevatable ram on the plate processing device of the present invention, and the guiding action can be performed through a comparatively simple construction. In addition, because the guide member follows the sliding surface, highly precise processing is unnecessary, and comparatively simple processing and assembly is obtained.

In addition, as one example of the plate processing device of the present invention, by the embodiment of the present invention in a shearing machine, the spacing between the upper blade and the lower blade can be automatically adjusted very easily.

In addition, the separation of the back gauge from the trailing edge of the workpiece can be speedily performed, and the back gauge can be quickly and accurately returned to its original position.

Furthermore, a plate pressurizing device secures the unsheared material on a table by pressure. Initially, a pressure pad contacts the workpiece with high capacity and low pressure. After, the pressure pad secures the workpiece to the table with low capacity and high pressure so that no noise is produced. In addition, the plate material is accurately secured.

Although only preferred embodiments are specifically illustrated and described herein, it will be appreciated that many modifications and variations of the present invention are possible in light of the above teachings and within the purview of the appended calls without departing from the spirit and intended scope of the invention.

What is claimed is:

1. A plate processing device for use in a machine having a vertically acting ram, said ram having first and second longitudinally extending vertical surfaces disposed on opposite sides thereof, comprising:
   a frame;
   a first blade mounted on said frame;
   a second blade mounted on said first vertical surface of said ram;
   means mounted on said frame for supporting said ram for free vertical movement on the frame so as to bring said blades together for plate processing action; means connected to said second vertical surface of said ram and mounted on said frame for adjusting a horizontal clearance between the first and second blade;
   a guide device mounted on the frame for guiding the ram and applying a bias against said first vertical surface of said ram for maintaining the horizontal clearance formed between said first blade and said second blade, said guide device including;
   (i) pressure activated means adjustably mounted on the frame, positioned with respect to the frame in a direction perpendicular to said vertical surfaces of the ram;
   (ii) a guide member for biasing said first surface of the ram in a direction perpendicular thereto, through more than two points which do not lie on a line;
   (iii) means for engaging the guide member with the pressure activated means in such a manner that the guide member can rotate about a first axis and a second axis, said axes lying a plane and being substantially parallel to said vertical surfaces of the ram and said axes being perpendicular to each other; whereby the clearance between the first blade and the second blade is reliably maintained.

2. The plate processing device of claim 1 wherein said engaging means comprises a first shaft mounted on the pressure activated means in such a manner that the longitudinal axis of the shaft lies in a plane substantially parallel to said vertical surfaces of the ram, and the shaft can freely rotate around its axis with respect to the pressure activated means, and
   a second shaft engaging with said first shaft in such a manner that the longitudinal axis thereof lies in the plane substantially parallel to said vertical surfaces of the ram and is substantially perpendicular to the axis of said first shaft, and the second shaft can freely rotate around its axis with respect to the first shaft.

3. The plate processing device of claim 1 wherein the guide member has means which are freely adjustable against said first surface of the ram.

* * * * *